Nov. 26, 1968     S. A. THORNTON     3,412,859
CANE JOUNCING MEANS
Filed Dec. 9, 1965     3 Sheets-Sheet 1
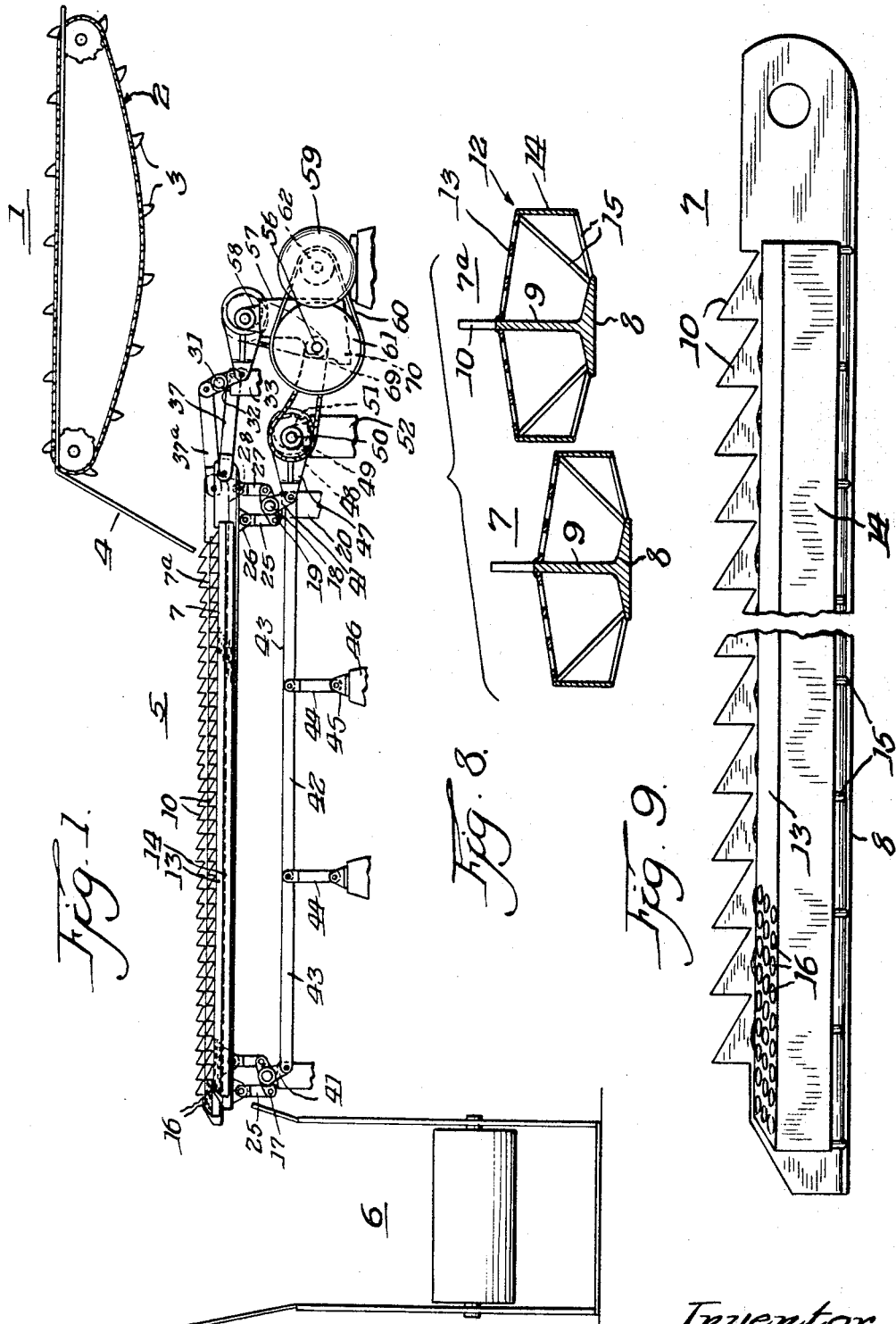
Inventor.
Samuel A. Thornton.
By Brown, Jackson, Boettcher & Dienner
Attys.

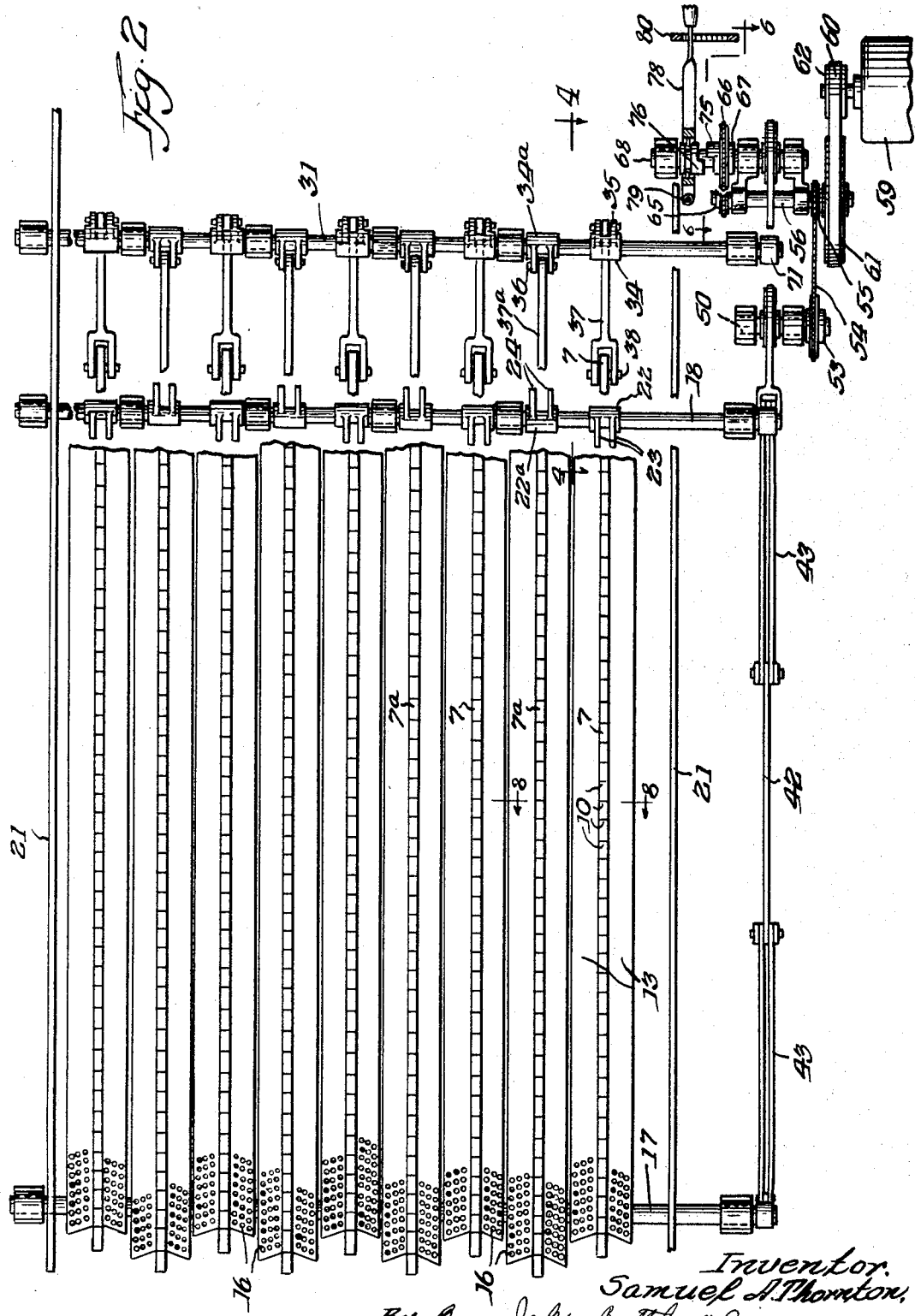

Nov. 26, 1968  S. A. THORNTON  3,412,859
CANE JOUNCING MEANS
Filed Dec. 9, 1965  3 Sheets-Sheet 3
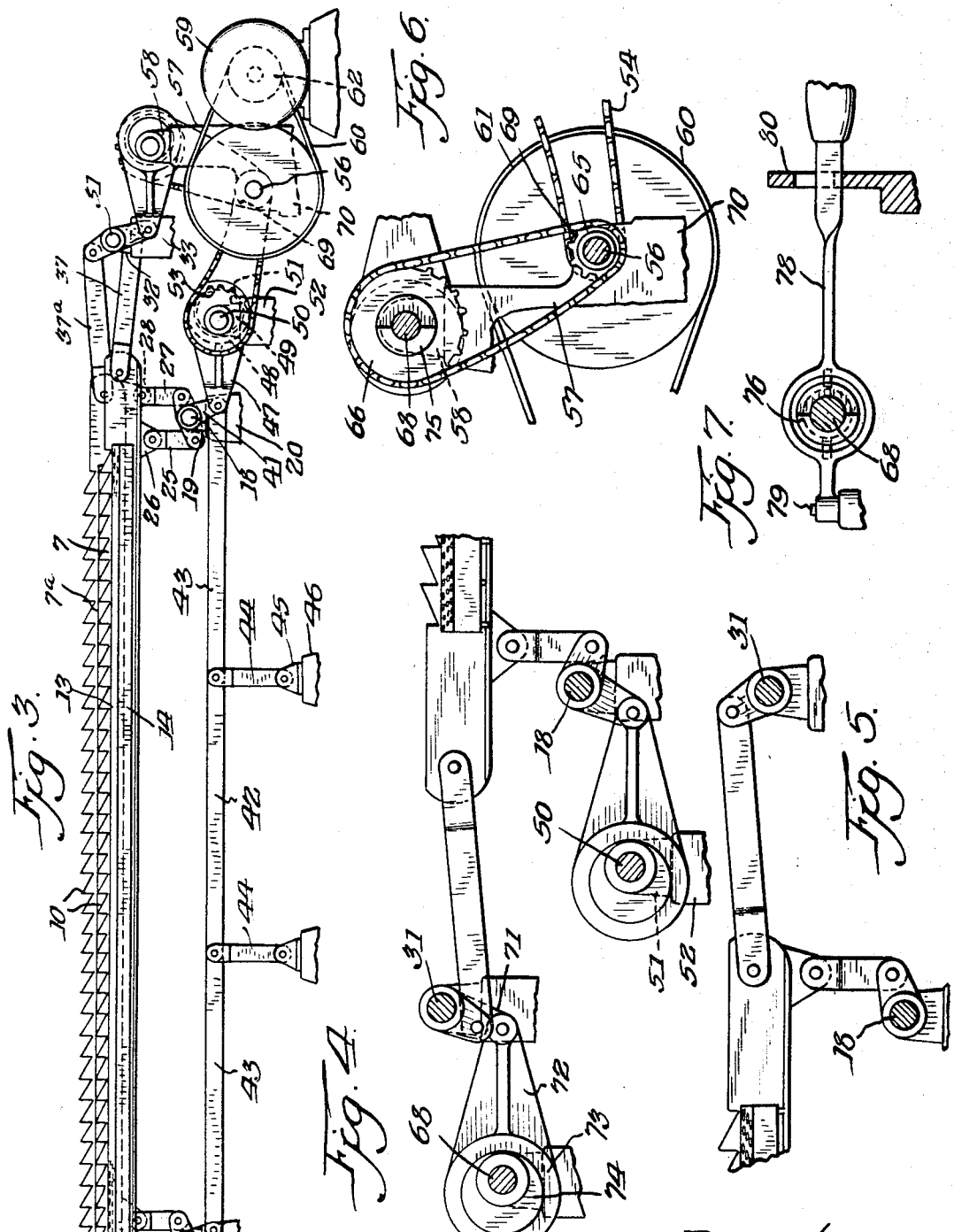
Inventor,
Samuel A. Thornton.

United States Patent Office 3,412,859
Patented Nov. 26, 1968

3,412,859
CANE JOUNCING MEANS
Samuel A. Thornton, Jeanerette, La., assignor to
Samuel A. Thornton, Jr., Alexandria, La.
Filed Dec. 9, 1965, Ser. No. 512,721
6 Claims. (Cl. 209—329)

ABSTRACT OF THE DISCLOSURE

Agitator bars are provided extending lengthwise of a feeder table in substantially parallel spaced relation and projecting above the top of the table. The bars are arranged in two groups with those of one group alternating with those of the other group. Pivoted linkage means pivotally connected to one end of the bars restrain them against appreciable endwise movement while accommodating vertical movement thereof for one of two selected modes of operation, wherein the bars of each group are reciprocated vertically and in opposite relation to the bars of the other group. In the other mode of operation, the bars of each group are reciprocated toward the discharge end of the feeder table during upward movement and toward the receiving end of the feeder table during downward movement and in opposite relation to the bars of the other group. The bars are driven from two rockably mounted shafts which are actuated by eccentric means on a first countershaft driven from a second countershaft by a chain and sprocket drive. The second countershaft is driven by a power source. Means for optionally rocking a third shaft suitably connected to the bars comprises a third countershaft, a sprocket rotatably mounted on the third shaft and driven by a sprocket and chain on the second countershaft, the sprocket having a single jaw clutch element, and a single jaw clutch member on the shaft and engageable with and disengageable from the sprocket element.

---

This invention relates to means for handling agricultural products, such as sugarcane and analogous products having canes or stalks of substantial length.

In sugar mills the cut stalks of the sugarcane, as they are brought in from the field, are dumped onto a receiving table over which an endless conveyor with appropriately disposed flights travels. The stalks are discharged from the receiving table onto a feeder table from which they are delivered to a carrier, in the form of an endless conveyor. From the carrier the stalks are delivered to appropriate treating means in the mill in a known manner.

The cane stalks as they come from the field have mixed with them substantial amounts of dirt, trash and other foreign materials which are objectionable and should be removed, for obvious reasons, prior to processing of the stalks. An important object of my invention is to provide means for agitating the cane stalks on the feeder table and thereby effectively removing the objectionable foreign materials from the stalks prior to delivery thereof to the carrier. To that end I provide a table with means effective for subjecting the stalks thereon to a generally vertical jouncing movement such that they are thoroughly agitated effective for loosening the foreign particles and separating them from the stalks. The separated foreign particles are discharged from the table and the cleaned stalks are delivered therefrom to the carrier.

The means for jouncing the stalks also functions as a feeder table and for feeding the stalks therealong to the carrier as desired. In sugar mill operations it frequently is necessary to interrupt briefly feeding of stalks to the carrier, to guard against overloading of the latter or for other reasons. A further important object of my invention is to provide means whereby the feeding function of the jouncing means may be interrupted as may be required without interruption of its jouncing or agitating function. It is also an important object of my invention to provide means whereby the operations of the members of the agitator and feeder members are at all times properly synchronized so as to assure accurate operation thereof when the feeding function is resumed after an interruption thereof.

Further objects and advantages of my invention will appear from the detail description.

In the drawings:

FIGURE 1 is a rather schematic side view of the feeder table and the jouncing and feeder means of my invention, in association with a cane receiving table and a cane carrier, certain parts being omitted for clearness of illustration;

FIGURE 2 is a plan view, on an enlarged scale, of the jouncing and feeder means of my invention, with certain parts broken away;

FIGURE 3 is a side view of the jouncing and feeder means of FIGURE 2, with the retainer wall omitted for clearness of illustration;

FIGURE 4 is a sectional view, on an enlarged scale, taken substantially on line 4—4 of FIGURE 2, with certain parts broken away;

FIGURE 5 is a sectional view similar to FIGURE 4 but looking in the opposite direction, and of less extent than FIGURE 4;

FIGURE 6 is a sectional view, on an enlarged scale taken substantially on line 6—6 of FIGURE 2;

FIGURE 7 is a sectional view similar to FIGURE 6 but looking in the opposite direction and of less extent than FIGURE 7;

FIGURE 8 is a sectional view, on an enlarged scale, taken substantially on line 8—8 of FIGURE 2; and FIGURE 9 is a side view, on an enlarged scale and partly broken away, of one of the bar members of the jouncing means.

The jouncer and feeder of my invention is shown, by way of example, as used in conjunction with a cane receiving table 1 over which travels an endless conveyor 2 provided with suitably disposed flights 3. The cane stalks are discharged from table 1 down an inclined apron 4 onto a feeder table 5 from which the cane stalks are delivered to a cane carrier 6, in the form of an endless conveyor, from which the stalks are delivered to appropriate treating apparatus, as is known. The receiving table 1 and the carrier 6 are of known type and driven in a known manner and need not be further considered in detail.

The jouncing and feeder means of my invention comprises a plurality of bars 7 and 7a extending lengthwise of the top of table 5, the bars being arranged in two groups with bars 7 alternating with bars 7a and being spaced apart, preferably approximately twelve inches, transversely of the table top. The bars 7 and 7a are of similar construction, each being of inverted T-shape in cross section and comprising a base flange 8 and an upwardly extending web element 9, the upper edge of which is serrated to provide a series of teeth 10 inclined upwardly towards the discharge end of table 5. Each of the bars 7 and 7a is enclosed in major portion by a sheet metal housing or boxing 12 open at its bottom. The housing 12 comprises two downwardly and outwardly inclined top plates 13 welded to web 9 of the bar adjacent the base of teeth 10, downwardly extending side plates 14 welded at their upper edges to the outer edges of top plates 13 and struts or braces 15 welded to the base flange 8 of the bar and to the top and side plates 13 and 14. The top plates 13 of the respective housings 12 are approximately three inches in width, assuming the bars 7 and 7a to be spaced on twelve inch centers, so that the side plates 14 of each bar are disposed closely adjacent those of the two next adjacent bars while the components of the respective housings 12 preferably are welded together and to the corresponding bar, it will be understood that they may be secured together in any suitable manner. The top plates 13 of the housings 12 are provided with perforations or openings 16 for a purpose to be explained more fully later. As will be understood from what has been said, the bars 7 and 7a with their housings 12 provide the feeder table 5 having a perforated top above which the teeth 10 of the bars 7 and 7a project.

Two horizontal shafts or beams 17 and 18 underlie the bars 7 and 7a adjacent the ends thereof, such shafts being disposed transversely of the table and rockably mounted in bearing blocks 19 suitably anchored to supporting columns or pedestals 20. The shafts 17 and 18 project outwardly beyond one of two retaining walls 21 provided at opposite sides of the table 5, as is usual. Each of the shafts 17 and 18 has fixed thereon a plurality of sleeves 22 and 22a disposed in spaced relation and arranged in two groups, the sleeves 22 being aligned with the bars 7 and the sleeves 22a being aligned with the bars 7a. Each of the sleeves 22 is provided with a pair of spaced arms 23 extending therefrom substantially radially of the associated shaft 17 or 18, and each of sleeves 22a is provided with a pair of spaced similar arms 24 extending therefrom substantially radially of the shaft, it being noted that the arms 23 are directed oppositely to the arms 24. A link 25 is pivotally mounted at its lower end between the arms 23 of each of the sleeves 22 and is pivotally mounted at its upper end to a bracket 26 secured to and extending downwardly from the base flange 8 of one of the bars 7, each of such bars being thus connected by a link adjacent each end, to the arms of sleeves 22 on the shafts 17 and 18, as will be understood. In like manner each of the bars 7a is connected, adjacent each end thereof, by a link 27 to the arms 24 of sleeves 22a of the shafts 17 and 18, links 27 being pivoted at their upper ends to brackets 28 secured to, and extending downwardly from the base flanges of the bars 7a.

A third horizontal shaft or beam 31 extends transversely of table 5 in parallel spaced relation to shaft 18, the shaft is rockably mounted in bearing blocks 32 anchored to supporting columns or pedestals 33. A plurality of sleeves 34 and 34a are fixed on shaft 31 in spaced relation and are arranged in two groups, the sleeves 34 being aligned with the sleeves 22 on shaft 18 and the sleeves 34a being aligned with the sleeves 22a on shaft 18. Each of the sleeves 34 is provided with a pair of arms 35 spaced apart and projecting therefrom substantially radially of shaft 31 and each of the sleeves 34a is likewise provided with a pair of spaced arms 36 projecting therefrom and disposed substantially radially of shaft 31. The sleeves 34 and 34a are arranged in two groups, sleeves 34 being aligned with sleeves 22 on shaft 18 and sleeves 34a being aligned with sleeves 22a on shaft 18, it being noted that the arms 35 of sleeve 34 are directed oppositely to the arms 36 of the sleeve 34a. A link 37 is pivotally mounted at its rearward end between arms 35 of each of the sleeves 34 and is pivotally connected at its forward end, at 38, to the rearward end of the corresponding bar 7. Means, to be explained more fully later, is provided for optionally rocking the shaft 31 and for locking it against rocking movement.

As previously noted, the shafts 17 and 18 project outwardly beyond table 5 and the retaining wall 21 at one side thereof. A downwardly extending crank arm 41 is fixed on the projecting outer end of each of the shafts 17 and 18. The crank arms 41 are connected by a linkage system comprising a central link 42 pivoted at its ends between the inner ends of two pairs of links 43, the outer ends of which are pivoted to the lower ends of the crank arms 41. The pivotal connections between the ends of link 42 and the pairs of links 43 are supported by substantially vertical links 44 pivoted thereto at their upper ends and pivoted at their lower ends to brackets 45 anchored to pedestals 46. The lower end of crank arm 41 secured on shaft 18 is also pivoted to the forward end of an arm 47 of an eccentric yoke 48 mounted on an eccentric 49 fixed on a stub countershaft 50 rotatably mounted in bearing blocks 51 anchored to pedestals 52. A sprocket wheel 53, keyed on the outer end of countershaft 50, receives a chain 54 which passes about a sprocket wheel 55 fixed on a second countershaft 56 disposed in parallel spaced relation to countershaft 50. The countershaft 56 is rotatably mounted in bearing blocks 57 anchored to pedestals 58. The countershaft 56 is driven from an electric motor 59 by a V-belt 60 passing about a pulley 61 keyed on countershaft 56 and about a variable speed pulley 62 keyed on the shaft of motor 59.

Assuming the third shaft 31 to be locked against the rocking movement, the agitator and feeder bars 7 and 7a are in the positions shown in FIGURE 3, the bars 7 of the one group being then positioned somewhat lower than and rearward of the bars 7a of the other group, assuming that the bars of both groups are at that time stationary. During rotation of the countershaft 50 the shafts 17 and 18 are rocked or oscillated about their axes and the bars 7 and 7a of the respective groups are alternately raised and lowered by their linkage connections to the shafts 17 and 18, the bars of one group moving upward as the bars of the other group move downward, such movement of the bars being rather abrupt and limited in extent. During such vertical up and down movement of the bars they are anchored against appreciable lengthwise movement by the links 37 pivoted to the bars 7 and the corresponding links 37a pivoted to the bars 7a and between the arms 36 of the sleeves 34a on the third shaft 31 which, as above noted, is assumed to be locked against rocking movement. During such vertical reciprocation of the groups of bars 7 and 7a there is no appreciable lengthwise movement thereof and they are ineffective for feeding the cane stalks toward the discharge end of table 5. The vertical reciprocation of the groups of bars 7 and 7a subjects the cane stalks to rather violent jouncing or agitation and is effective for separating the objectionable foreign materials therefrom, such separated materials passing downward through the perforations or openings 16 of table 5 to the space therebeneath.

The second countershaft 56 has fixed thereon a second sprocket wheel 65 which receives a chain 66 passing about a sprocket wheel 67 rotatably mounted on a third countershaft 68 disposed in parallel spaced relation to the countershaft 56. The countershaft 68 is rotatably mounted in bearing blocks 69 anchored to pedestals 70. A crank arm 71, fixed on the outer end of the third shaft 31, is pivoted at its lower end to the forward end of arm 72 of an eccentric yoke 73 fitting about an eccentric fixed on the countershaft 68. The sprocket 67 is provided at one side thereof with a cylindrical hub which is cut away for half its circumference to provide a clutch element 75. An opposed single jaw clutch member 76 is splined on countershaft 68 for movement into and out of engagement with the clutch element 75. When the clutch member 76 is in its disengaged position, as shown in FIGURE 2, the eccentric 74 on countershaft 68 is then at its dead center position shown in FIGURE 3 effective for locking the third shaft 31 against oscillatory or rocking movement and the groups of agitator and feeder bars 7 and 7a are then reciprocated vertically with no appreciable lengthwise movement, as previously described.

The clutch member 75 may be operated in any suitable manner. Conveniently it is operated by a clutch shift bar 78 pivoted at one end at 79 and held in adjustment by a cooperating rack 80. When the clutch member 76 is engaged with the clutch element 75 of sprocket 67 the third countershaft 68 is rotated and the shaft 31 is then oscillated or rocked about its axis. The agitator and feeder bars of the respective groups 7 and 7a thereof are then reciprocated vertically as above explained and are also reciprocated lengthwise, being then effective for feeding the cane stalks lengthwise over the feeder table 5 and delivering them to the carrier. When it is desired to interrupt feed of the stalks to the carrier, the clutch member 76 is moved to its disengaged position thereby stopping feed of the stalk to the carrier without interrupting the vertical reciprocation of the bars 7 and 7a of the two groups thereof. By moving clutch member 76 to its engaged position, the feeding function of the bars 7 and 7a is resumed without interruption of their vertical reciprocation. The sprocket and chain drives between the shafts 50 and 56 and 56 and 68, in conjunction with the single jaw clutch means for sprocket 67 assures that the bars 7 and 7a of the respective groups thereof will be moved lengthwise toward the discharge end of table 5 while they are moving upward vertically relative thereto and will be moved toward the receiving end of table 5 while they are being moved downward relative thereto. That is important in assuring that the bars 7 and 7a will function to maximum capacity in feeding the stalks along table 5 toward the discharge end thereof and to the carrier. The shafts or beams 17 and 18 and 31 have been shown, by way of illustration, as of cylindrical form. It will be understood that they may be of any suitable form desired. Further, I have illustrated the cane jouncing means of my invention, by way of illustration only, as used in conjunction with a cane feeder and a cane carrier of conventional type. It is to be understood, however, that my subject invention may be used in conjunction with any other suitable mechanism and for any suitable additional purpose, such as power actuated cane chopper means of any conventional suitable design employing disc-type or chopper-knife-type located and operated adjacent the discharge end of my invention cane jouncer means heretofore described.

As above indicated, it will be understood that changes in detail may be resorted to without departing from the field and scope of my invention, and I intend to include all such variations, as fall within the scope of the appended claims, in this application in which the preferred form only of my invention has been disclosed.

I claim:

1. In cane stalk handling means, a feeder table having a receiving end and a discharge end, agitator bars extending lengthwise of said table in substantially parallel spaced relation and projecting above the top of said table, said bars being arranged in two groups with those of one group alternating with those of the other group, pivoted linkage means pivotally connected to one end of said bars and restraining them against appreciable endwise movement while accommodating vertical movement thereof, and means for reciprocating the bars of each group substantially vertically and in opposite relation to the bars of the other group, the respective bars having secured to opposite sides thereof perforated top plates extending between adjacent bars and providing a sectional table top.

2. In cane stalk handling means, a feeder table having a receiving end and a discharge end, agitator bars extending lengthwise of said table in substantially parallel spaced relation and projecting above the top of said table, said bars having serrated upper edges and being arranged in two groups with those of one group alternating with those of the other group, pivoted linkage means pivotally connected to the ends of said bars adjacent the receiving end of said table and restraining said bars against appreciable endwise movement while accommodating vertical movement thereof, and means for reciprocating the bars of each group substantially vertically and in opposite relation to the bars of the other group, the respective bars having secured to opposite sides thereof perforated top plates extending between adjacent bars and providing a sectional table top.

3. Cane stalk handling means substantially as defined in claim 1 and in which the means for reciprocating the respective groups of bars comprises rockably mounted shafts and linkage connections between said shafts and bars.

4. Cane stalk handling means substantially as defined in claim 1 and in which the means for reciprocating the respective groups of bars comprises rockably mounted shafts underlying the end portions of said bars, arms fixed on said shafts extending substantially radially therefrom and arranged in two groups with the arms of one group alternating with and disposed oppositely to those of the other group, and links pivoted at their lower end to the arms of the respective groups thereof and pivoted at their upper ends to the bars of the respective groups of the latter.

5. Cane stalk handling means substantially as defined in claim 1 and in which said linkage means comprises selectively engageable and disengageable means for reciprocating said bars lengthwise and to substantial extent and effective for moving the bars of each group toward the discharge end of said table during the upward movement of said bars and toward the receiving end of said table during the downward movement of said bars and said bars have serrated upper edges with the teeth thereof inclined upward toward the discharge end of said table.

6. In cane stalk handling means, a feeder table having a receiving end and a discharge end, agitator bars extending lengthwise of said table in substantially parallel spaced relation and projecting above the top of said table, said bars having serrated upper edges with the teeth thereof inclined upward toward the discharge end of said table and being arranged in two groups with those of one group alternating with those of the other group, two rockably mounted shafts underlying said table and extending transversely thereof adjacent the ends of said bars, connections between said shafts and said bars effective for raising and lowering the bars of the respective groups thereof in opposite relation incident to rocking of said shafts, a third rockably mounted shaft adjacent and substantially parallel with the receiving end of said table, connections between said third shaft and said bars effective for reciprocating the respective groups thereof lengthwise in opposite relation and for moving the bars of each group toward the discharge end of the table during the upward movement of such bars and toward the receiving end of the table during their downward movement, and means for optionally rocking said third shaft, in which cane stalk handling means said two shafts are actuated by eccentric means on a first countershaft driven from a second countershaft by a chain and sprocket drive, the second countershaft is driven by a power source, and the means for optionally rocking said third shaft comprises a third countershaft, a sprocket rotatably mounted on said third shaft and driven by a sprocket and chain on said second countershaft, said sprocket on said third shaft having a single jaw clutch element, and a single jaw clutch member splined on said third shaft and engageable with and disengageable from said sprocket element.

(References on following page)

References Cited

UNITED STATES PATENTS

| | | | |
|---|---|---|---|
| 37,549 | 1/1863 | Major | 130—26 |
| 144,721 | 11/1873 | Wilders | 198—221 X |
| 818,009 | 4/1906 | Wood. | |
| 1,472,439 | 10/1923 | Sandoe | 209—396 |
| 1,675,948 | 7/1928 | McKee | 198—219 |
| 1,681,101 | 4/1928 | Cuyle | 198—218 |
| 1,686,696 | 10/1928 | Hirschmann | 209—396 |
| 1,997,318 | 4/1935 | Smallwood | 198—219 |
| 2,432,852 | 12/1947 | Aruidson | 198—218 X |
| 3,106,523 | 10/1963 | Couture | 209—396 X |

FOREIGN PATENTS

| | | |
|---|---|---|
| 2,478 | 11/1893 | Great Britain. |
| 87,706 | 3/1922 | Austria. |

HARRY B. THORNTON, *Primary Examiner.*

R. HALPER, *Assistant Examiner.*